(12) United States Patent
Goncharenko et al.

(10) Patent No.: US 7,716,636 B2
(45) Date of Patent: May 11, 2010

(54) USER INTERFACE FOR ACCESSING AND LOADING SOFTWARE COMPONENTS OF A DEVELOPMENT SET ON A COMPUTER WHILE OTHER SOFTWARE COMPONENTS OF THE SET ARE LOADING

(75) Inventors: Dmitry G. Goncharenko, Redmond, WA (US); Michael E. Pietraszak, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 11/032,510

(22) Filed: Jan. 10, 2005

(65) Prior Publication Data

US 2006/0156272 A1 Jul. 13, 2006

(51) Int. Cl.
G06F 9/44 (2006.01)
G06F 9/445 (2006.01)

(52) U.S. Cl. .................................. 717/113; 717/178

(58) Field of Classification Search ......... 717/101–113, 717/176–178
See application file for complete search history.

(56) References Cited

U.S. PATENT DOCUMENTS 6,968,538 B2 * 11/2005 Rust et al. .................. 717/108

2006/0156271 A1 * 7/2006 Goncharenko et al. ...... 717/100

OTHER PUBLICATIONS

Parihar et al. "ASP.NET Bible", 2002, Hungry Minds Inc., pp. 1-132.*
Lam, "Run-Time Interface Mapping for On-The-Fly Software Component Integration", 2002, Pace University, pp. i-x, 1-157.*
Iobion, "GeneTraffic TM DUE User Manual", Jun. 2004, Iobion Informatics, LLC, pp. 1-199.*
Parihar et al., "ASP.NET Bible", 2002, Hungry Minds, Chapter 21, pp. 365-383.*

* cited by examiner

*Primary Examiner*—Ted T Vo
(74) *Attorney, Agent, or Firm*—Wolf, Greenfield & Sacks, P.C.

(57) ABSTRACT

A user interface provides a visual representation of a software development set being loaded on to a computer, including displaying the contents (e.g., constituent software components) of the development set. Contents of the development set may be displayed before the contents have even been loaded on to the computer. The user interface may enable the user to select one or more of the software components of the development set (or the development set itself). In response to the user selection, the user may be enabled to perform limited operations on the software components. A user may be enabled to select, from the visual representation, a software component of the loading set that has not yet been loaded on to the computer.

10 Claims, 11 Drawing Sheets

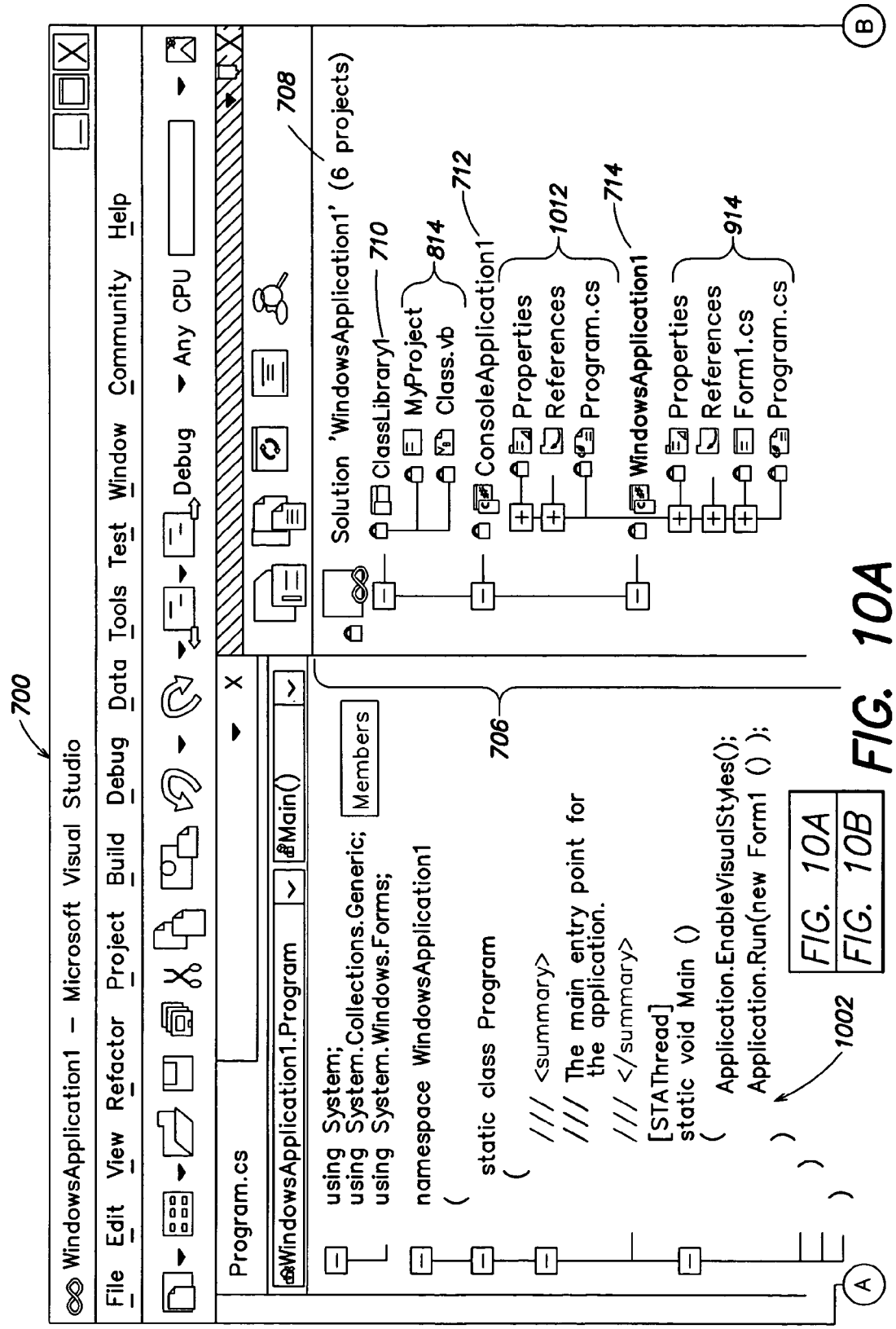

USER INTERFACE FOR ACCESSING AND LOADING SOFTWARE COMPONENTS OF A DEVELOPMENT SET ON A COMPUTER WHILE OTHER SOFTWARE COMPONENTS OF THE SET ARE LOADING

BACKGROUND

Developing software applications and products often requires the coordinated efforts of many developers (e.g., software programmers). This development often involves the creation and modification of several software components (e.g., files), the collective body of which is often stored in a centralized, common repository shared by the developers. There are several Integrated Development Environments (IDEs) available today to assist developers in collaboratively developing software, such as, for example, Microsoft® Visual Studio® (MVS) available from Microsoft Corporation. IDEs enable developers to organize a set of software components (e.g., as a directory or some other form of hierarchy) as a single entity referred to herein as a "development set." For example, MVS packages a plurality of software components as a "solution," where each solution may include one or more software components (e.g., "projects" and/or files), and where each package may include one or more components (e.g., files).

As used herein, a "software component" is a component of a larger software entity, for example, an application (program), a development package, a project, a software product, another software component, another type of software entity, or any combination thereof. A software component may be, for example, a project, a program, a file, a directory, an object, a record, a table, another type of software abstraction, or any combination thereof.

During the course of collaborative software development, a developer often loads a local copy of a development set (e.g., a solution) from a repository to the developer's computer. Loading a development set onto a computer can be a time-consuming task, especially if the application is being loaded remotely over a communications network (i.e., a network). As used herein, a "network" is a group of two or more components interconnected by one or more segments of transmission media on which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segments. Further, it should be appreciated that when a network is illustrated in a drawing of this application as being connected to an element in the drawing, the connected element itself is considered part of the network.

During the loading of at least a portion of a development set (e.g., one or more files and/or packages or the entire set), a typical IDE does not allow a developer to access any of the software components of the portion until the entire portion has been loaded onto the developer's computer. Although a developer may only need to work on a small subset of the software components of the portion (e.g., a single project or one or more files thereof), the developer must wait until the entire portion is loaded, which may take tens of seconds, minutes or even hours, depending on the size of the set. Such delays are often unacceptable in today's fast-paced business world, and result in frustrated developers and inefficient uses of developers' time.

SUMMARY

Described herein are systems and methods for enabling users (e.g., developers) to access software components of a software set (e.g. a development set) while the set (or a portion thereof) is loading (e.g., downloading) on to the computer.

A user interface may provide a visual representation of the software set being loaded on to a computer, including displaying the contents (e.g., constituent software components) of the software set. Contents of the software set may be displayed before the contents have even been loaded on to the computer. The user interface may enable the user to select one or more of the software components of the software set (or the software set itself). In response to the user selection, the user may be enabled to perform limited operations on the software components such as, for example, operations that do not affect other software components of the set, or that at least don't affect components that have not been loaded yet. For example, if the software component is a file of a project and contains source code, the user may be enabled to edit the file, but not build (i.e., compile) the project into object code.

In some embodiments, when an application (e.g., MVS) is loading a software set, user events (e.g., mouse clicks, keystrokes, etc.) occurring within the application during the loading take precedence over the loading. Further, a user may be enabled to select (e.g., from the visual representation) a software component of the loading set that has not yet been loaded on to the computer. In response, the selected component may be loaded on to the computer, for example, using a separate process or thread from the process or thread loading the software set, and the process or thread loading the selected component may be given precedence (i.e., priority) over the separate process or thread loading the remainder of the software set. For example, if separate processes are used, the process loading the software set may be designated as a background process. Further, the selected component may be loaded asynchronously; that is, irrespective of the particular synchronous order in which the software components of the software set are being loaded.

In an embodiment of the invention, a user is enabled to control a loading of a software development set on to a computer, the software development set including a plurality of software components. A visual representation of the software development set is displayed as the software development set is being loaded on to the computer, including displaying one or more software components included in the software development set. A user is enabled to select one of the software components, which has not been loaded yet, from the visual representation, so that the selected software component is loaded irrespective of the particular order.

In an aspect of this embodiment, displaying the visual representation includes, for each of the one of more software components, displaying the software component prior to the software component being loaded on to the computer.

In another aspect of this embodiment, for each of the one or more software components, an indication of when the software component is loading is displayed and/or an indication of when the software component has completed loading is displayed.

In another aspect of this embodiment, a user selection is received specifying one of the software components that has not been loaded yet as part of the loading of the software development set. In response to receiving the user input, the selected software component is loaded on to the computer, irrespective of the position of the selected component within the particular order, prior to the completion of the loading of the software development set.

In yet another aspect of this embodiment, the user is enabled to perform one or more operations on the software development set and/or one or more of the software components of the software development set prior to a completion of the loading of the software development set on to the computer.

In another aspect of this embodiment, at least one of the one or more software components is a file including source code, and enabling the user to perform one or more operations includes enabling the user to modify the source code of the at least one file.

In another aspect of this embodiment, software components of the software development set continue to be loaded on to the computer, concurrently to the selected software component being loaded on to the computer.

In another aspect of this embodiment, the embodiment of the invention described in the preceding paragraphs and/or one or more aspects thereof is implemented using a version of Microsoft® Visual Studio® available from Microsoft Corporation.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided for enabling a user to control a loading of a software development set on to a computer, the software development set including a plurality of software components. The system includes a user interface to control a display of a visual representation of the software development set as the software development set is being loaded on to the computer, including displaying one or more software components included in the software development set, and to enable a user to select one of the software components from the visual representation, which that has not been loaded yet, so that the selected software component is loaded irrespective of the particular order.

In an aspect of this embodiment, the user interface is operative to control, for each of the one of more software components, displaying the software component prior to the software component being loaded on to the computer.

In another aspect of this embodiment, the user interface is operative to control, for each of the one or more software components, displaying an indication of when the software component is loading and/or displaying an indication of when the software component has completed loading.

In another aspect of this embodiment, the system further includes a loading module to receive a user input specifying a selection of one of the software components that has not been loaded yet as part of the loading of the software development set, and to load, in response to receiving the user input, the selected software component on to the computer, irrespective of the position of the selected component within the particular order, prior to the completion of the loading of the software development set.

In yet another aspect of this embodiment, the system further includes an editing module to enable the user to perform one or more operations on the software development set and/ or one or more of the software components of the software development set prior to a completion of the loading of the software development set on to the computer.

In another aspect of this embodiment, at least one of the one or more software components is a file including source code, and the editing module is operative to enable the user to modify the source code of the at least one file.

In another aspect of this embodiment, the system further includes a loading module to continue loading software components of the software development set on to the computer, concurrently to the user interface enabling the user to select one of the software components.

In yet another aspect of this embodiment, the user interface is implemented using a version of Microsoft® Visual Studio® available from Microsoft Corporation.

In another embodiment of the invention, a user is provided access to a software development set including a plurality of software components. A visual representation of the software development set is displayed as the software development set is being loaded on to the computer, including displaying one or more of the software components included in the software development set. A user is enabled to select an item from the visual representation as the software development set is being loaded on to the computer, the item representing the software development set or one or more of the software components, so that the user can perform operations on the selected item.

In an aspect of this embodiment, displaying the visual representation includes, for each of the one of more software components, displaying the software component prior to the software component being loaded on to the computer.

In another aspect of this embodiment, displaying the visual representation includes, for each of the one or more software components, displaying an indication of when the software component is loading and/or when the software component has completed loading.

In another aspect of this embodiment, the software development set is being loaded in a particular order. A user selection specifying one of the software components that has not been loaded yet as part of the loading of the software development set is received. In response to receiving the user selection, the selected software component is loaded on to the computer, irrespective of the position of the selected component within the particular order, prior to the completion of the loading of the software development set.

In another aspect of this embodiment, at least one of the one or more software components is a file including source code, and the user is enabled to modify the source code of the at least one file.

In another aspect of this embodiment, software components of the software development set continued to be loaded on to the computer, concurrently to the user being enabled to select an item from the visual representation.

In yet another aspect of this embodiment, the embodiment of the invention described in the preceding paragraphs and/or one or more aspects thereof is implemented using a version of Microsoft® Visual Studio® available from Microsoft Corporation.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided for providing a user access to a software development set including a plurality of software components. The system includes a user interface to control a display of a visual representation of the software development set as the software development set is being loaded on to the computer, including displaying one or more of the software components included in the software development set, and to enable a user to select an item from the visual representation as the software development set is being loaded on to the computer, the item representing the software development set or one or more of the software components, so that the user can perform operations on the selected item.

In an aspect of this embodiment, the user interface is operative to control, for each of the one of more software components, displaying the software component prior to the software component being loaded on to the computer.

In another aspect of this embodiment, the user interface is operative to control, for each of the one or more software components, displaying an indication of when the software component is loading and/or when the software component has completed loading.

In another aspect of this embodiment, the software development set is being loaded in a particular order. The system further includes a loading module to receive a user input specifying a selection of one of the software components that has not been loaded yet as part of the loading of the software development set, and to load, in response to receiving the user input, the selected software component on to the computer, irrespective of the position of the selected component within the particular order, prior to the completion of the loading of the software development set.

In another aspect of this embodiment, at least one of the one or more software components is a file including source code. The system further includes an editing module to enable the user to modify the source code of the at least one file.

In another aspect of this embodiment, the system further includes a loading module to continue loading software components of the software development set on to the computer, concurrently to the user interface enabling the user to select am item from the visual representation.

In yet another embodiment of the invention, the user interface is implemented using a version of Microsoft® Visual Studio® available from Microsoft Corporation.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIGS. 7-10B illustrate an example of a user interface display for making software components of a development set available to users as the development set is loading on to a computer;

DETAILED DESCRIPTION

Although some embodiments of the invention are described in relation to loading a development set onto a computer, the invention is not so limited. Loading other types of software sets such as, for example, software sets that include object code as an alternative or in addition to source code, is intended to fall within the scope of the invention.

Further, it should be appreciated that the invention is not limited to the loading of a complete software set, but is applicable to situations in which only a portion of a software set is being loaded. For example, some embodiments of the invention may include loading an entire VMS solution, while other embodiments may include loading less than all the packages and/or files of the solution.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
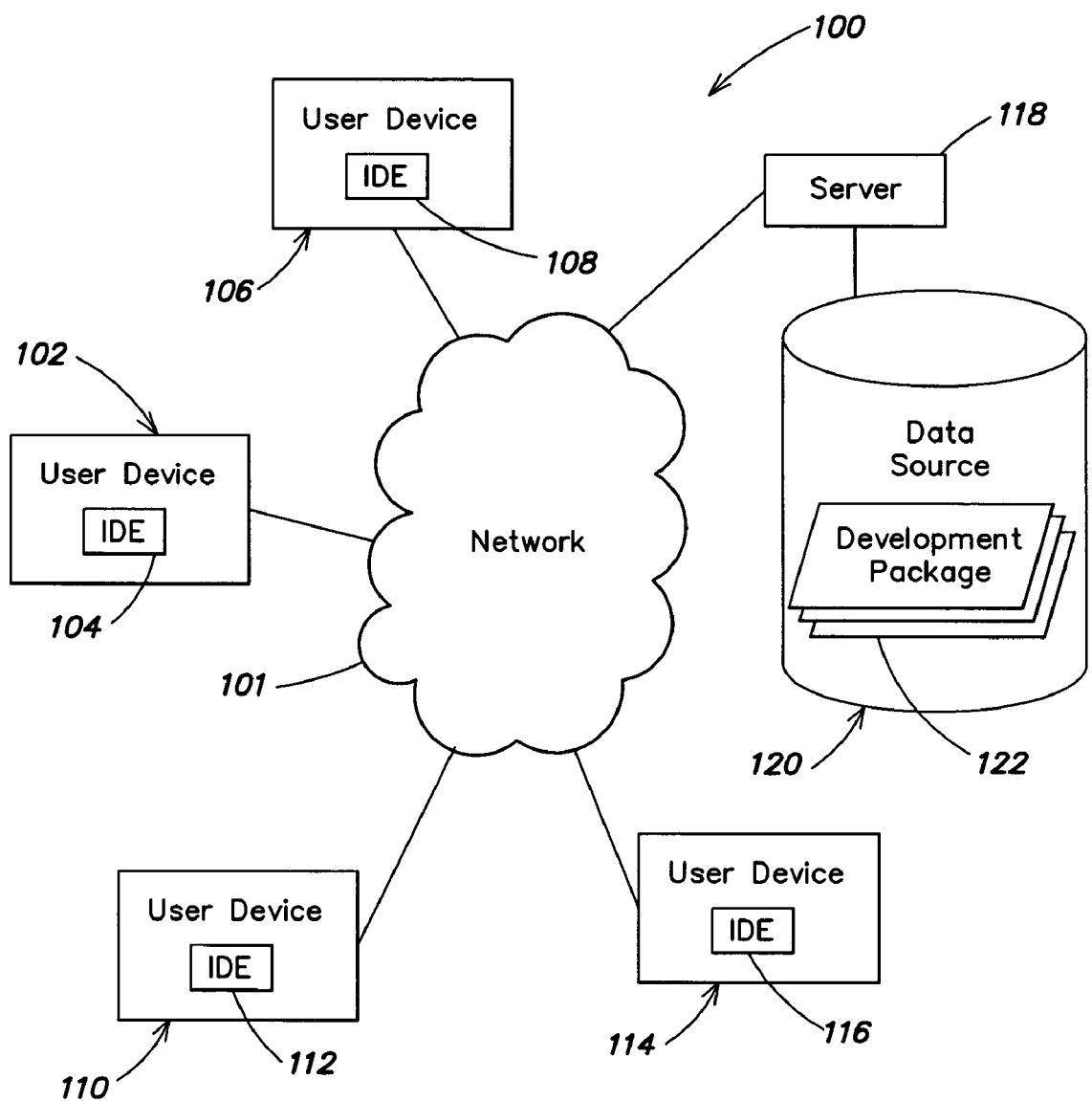
FIG. 1 is a block diagram illustrating an example of a network system on which some embodiments of the invention may be implemented.

FIG. 1 is a block diagram illustrating an example of a network system 100 on which some embodiments of the invention may be implemented. System 100 is merely an illustrative embodiment of a network system on which embodiments of the invention may be implemented, and is not intended to limit the scope of the invention. Any of numerous other implementations of such a system, for example, variations of system 100, are possible and are intended to fall within the scope of the invention.

Network system 100 may include any of: user's devices 102, 106, 110 and 114; server 18; data source 120; other network elements; or any suitable combination of the foregoing. As used herein, a "user device" is a communication and/or computational device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

Network 101 may be any of a variety of types of network including, but not limited to, a local area network (LAN), a metropolitan area network (MAN), a wide-area network (WAN), a wireless network, another type of network, or any suitable combination of the foregoing. Although FIG. 1 only shows four user devices, one server and one data source, it should be appreciated that system 100 may include any number (e.g., tens, hundreds or even thousands) of each of these network elements.

Data source 120 may be any of the plurality of types of data sources such as, for example, a database (e.g., an object-orientated database, relational database, file system, other types of databases, or any suitable combination thereof). Server 118 may be configured to provide one or more services for users on network 101. For example, server 118 may be configured to provide services relating to software development and may manage access to one or more development sets and/or portions thereof stored on data source 120.

One or more of user devices 102, 106, 110 and 114 may be configured to implement one or more software development technologies such as, for example, an IDE (e.g., IDE 104, 108, 112 and 116, respectively). These IDEs may assist users in developing a software application in a collaborative environment, where each user periodically may load a development set or portion thereof onto the user's device. Each IDE 104, 108, 110 and 116 may be any of a variety of type of IDEs such as, for example, Microsoft® Visual Studio® (MVS) available from the Microsoft Corporation.

Figure 2:
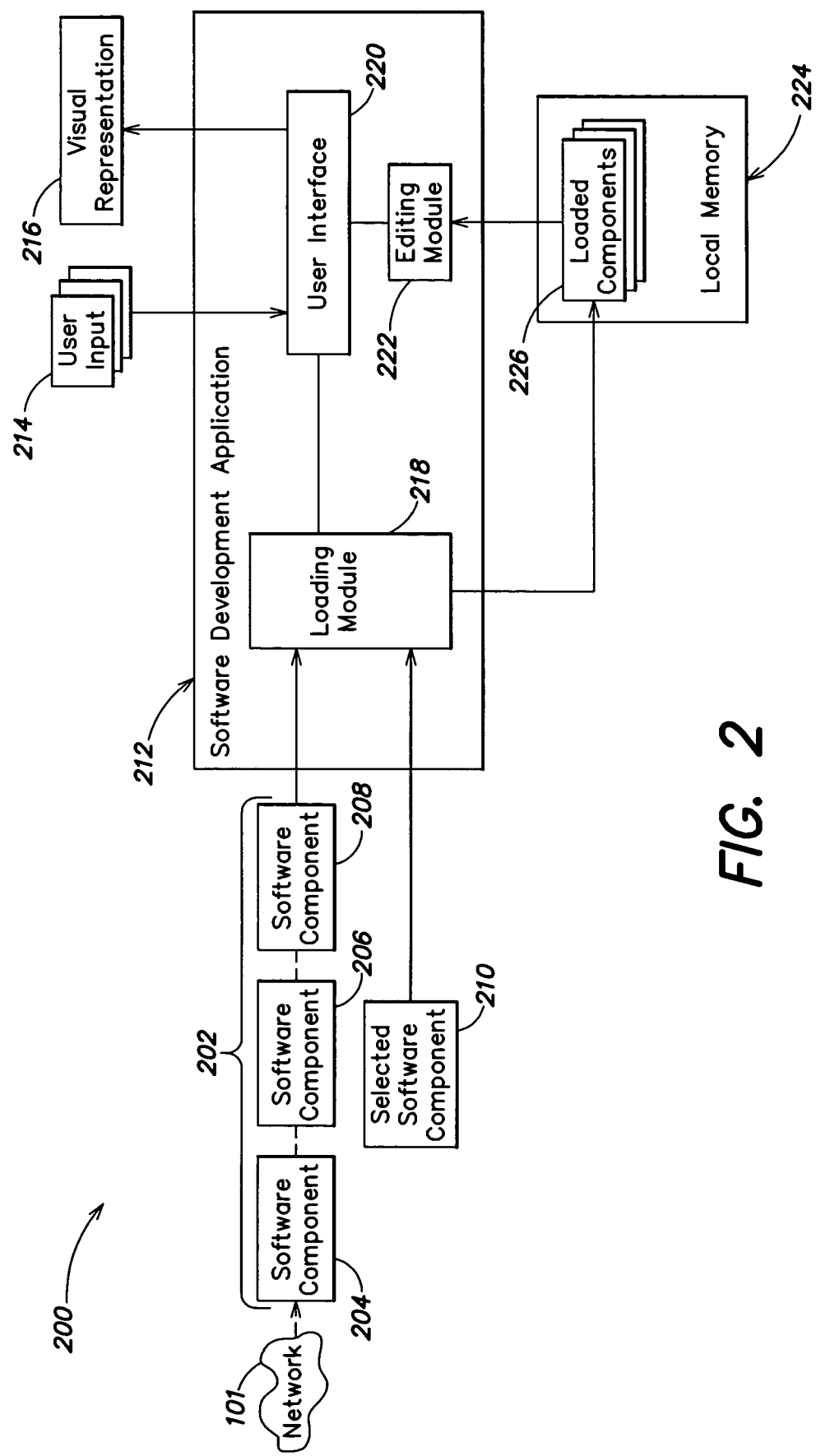
FIG. 2 is a block diagram illustrating an example of a system for accessing and loading software components of a development set on a computer while other software components of the set are being loaded onto the computer.

FIG. 2 is a block diagram illustrating an example of a system 200 for accessing and loading software components of a development set on a computer while other software components of the set are being loaded onto the computer. System 100 is merely an illustrative embodiment of a system for accessing and loading software components of a development set onto a computer while other software components of the set are loading, and is not intended to limit the scope of the invention. Any of numerous other implementations of such a system, for example, variations of system 200, are possible and are intended to fall within the scope of the invention.

System 200 may include any of: network 101, loading module 218, user interface 220, editing module 222 and local memory 224. Elements 218, 220 and 222 may be considered elements of a software development application 212, which may be a part of an IDE.

Loading module 218 may be configured to load a development set 202 including a plurality of software components 204, 206 and 208. The development set may be any of a plurality of types of development sets such as, for example, an MVS solution. In some embodiments (e.g., an embodiment in which the development set is an MVS solution), the software components of the solution may be arranged in a hierarchical fashion. For example, at a first level of the hierarchy, the solution may include one or more files and/or one or more projects (e.g., MVS projects). Typically, an MVS project is a buildable entity, representing an executable, dynamic or static library or a Microsoft®.NET assembly.

When a typical IDE loads a development set onto a computer, it does so "synchronously," in that it loads the entire development set as an uninterrupted stream and in a particular order. While the development set is loading, the IDE prevents the user from being able to use the IDE and/or access the development set. For example, the IDE may be configured such that user events (e.g., mouse clicks and keystrokes) are not given priority over the loading process.

In some embodiments of the invention, the loading module 218 may be configured to divide the loading process of a development set (e.g., set 202) into a plurality of parts. The loading process may be divided along the boundaries of the software components of which the development set is comprised. For example, if the development set is an MVS solution, the loading process may be divided into a plurality of parts, where each part corresponds to a software component of the solution. The granularity of this division may vary. For example, an MVS solution may be divided into files, file folders and projects, or may be divided in a multi-level, hierarchical fashion according to the projects, and files and file folders within each project.

The loading module 218 may be configured to load a development set using a background process; that is, a process that executes during idle time of the processor of the computer system on which the development set is being loaded. By loading the development set as a background process, actions, events and processes initiated by a user may take precedence over the loading of the development set 202. Loading module 218 may store each loaded component 226 in local memory (e.g., on local disk 224), so that users can access (e.g., open and modify) the loaded components, for example, using editing module 222.

Editing module may enable users to perform operations on loaded components 226, while the loading module 218 continues to load set 202. The editing module may limit the operations that a user may perform on the loaded components. For example, operations that affect or could possibly affect other software components of the set 202 may be disabled by editing module 222, while other operations may be enabled. For example, a user may be enabled to modify properties of a software component or, if the component is a file (e.g., a form or source code), amend the file, but not be allowed to build a project or otherwise compile software components. Editing module 222 may control (e.g., in conjunction with user interface 220) the editing window 702 of user interface display 700.

User interface 220 may be configured to enable users to view the progress of a loading of a development set, and may be configured to enable users to select, open and/or initiate a loading of a software component. User interface 220 may be configured to display a visual representation of a development set currently being loaded, for example, using a user interface display (e.g., display 700 described below in relation to FIGS. 7-10).

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display," respectively.

User interface 220 may interact with editing module 222, for example, to implement editing window 702 of display 700. User interface 220 may inform editing module 222 when a user has selected (e.g., as indicated by one or more user inputs 214) a software component, and editing module 222 may assist user interface 220 in controlling the permitted operations that may be performed on the selected component.

Further, user interface 220 may interact with loading module 208. Loading module 218 may keep user interface 220 informed about the progress of the loading of a set (e.g., set 202), so that the user interface can appropriately update the visual representation of the set (e.g., in display 700). User interface 220 may be configured to indicate the presence of a software component in a set even before the set has been loaded. For example, loading module 218, user interface 220, and/or other system components may determine the contents of a development set (e.g., a solution) or a software component (e.g., a project) before the contents are actually loaded based on information (e.g., metadata) included within the set or software component.

In response to a user selecting (e.g., from the visual representation of the set) a software component (or the set itself) that has not been loaded yet, the user interface 220 may inform the loading module 218 to load the selected item asynchronously (e.g. out-of-turn). In response, the loading module may initiate the loading of the selected software component (e.g., component 210) so that the selected component is loaded asynchronously and concurrently to the software components 204-208 of the set 202. As discussed above, the loading module may give the loading of the selected component priority over the loading of the remainder of the set. The selected component may be given priority by using multiple threads within a single process to load, in parallel, the set and the selected component. For example, a first thread may be used to load the set, and a second thread, configured to have a higher priority than the first thread, may be used to load the selected component. Alternatively, multiple processes may be used, where a process loading the selected component is configured to have priority over a process loading the remainder of the set. For example, the set may be downloaded as a background process and/or the selected component may be executed as a primary process.

It should be appreciated that, in some embodiments of the invention, the user may be enabled to select multiple components of a set for asynchronous download. Further, a selected component may include a plurality of other components. Thus, multiple selected components may be loaded in parallel with the remainder of the set. These multiple software components may be loaded serially as part of a same thread or process or may be loaded in parallel as part of separate threads or processes. Further, each of the one or more processes or threads loading the multiple components may be given priority over the thread or process loading the remainder of the set.

System 200 and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 200 may reside on a single device (e.g., a computer), or one or more components may reside on separate, discrete devices. Further, each component may be distributed across multiple devices, and one or more of the devices may be interconnected.

Further, on each of the one or more devices that include one or more components of system 200, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 200, and components thereof, may be implemented using a computer system such as that described below in relation to FIGS. 12 and 13.

FIGS. 3-6 illustrate, symbolically, a process of a user interface making software components of a development set available to users as the development set is loading on to a computer. Although FIGS. 3-6 will now be described using the example of an MVS solution, it should be appreciated that the invention is not so limited, as the example of FIGS. 3-6 may be applied to other types of development sets and software sets.

In FIGS. 3-6, solutions are represented by rectangles, projects are represented by hexagons and names (e.g., P1, P2 and P3), and files are represented by triangles. Further, dashed lines indicate that the existence of an item is known (e.g., by the application loading the set), but not yet loaded on to the computer, and solid lines indicate that the item has been loaded.

Figure 3:
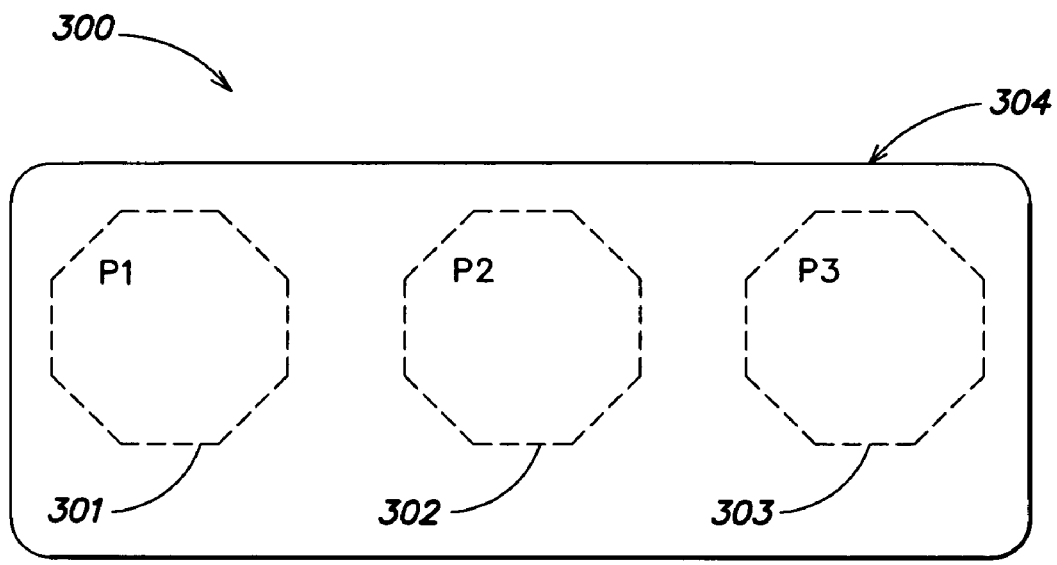
FIGS. 3-6 illustrate a process of a user interface making software components of a development set available to users as the development set is loading on to a computer.

In representation 300 of FIG. 3, a solution 304 has been loaded, and the projects P1, P2 and P3 (e.g., 301-303) of the solution are loading. A relatively limited amount (e.g., a minimal amount) of information is known about the projects; enough information to visually indicate the presence of the projects, but not enough to display any of the contents of the projects 301-303.

Figure 4:
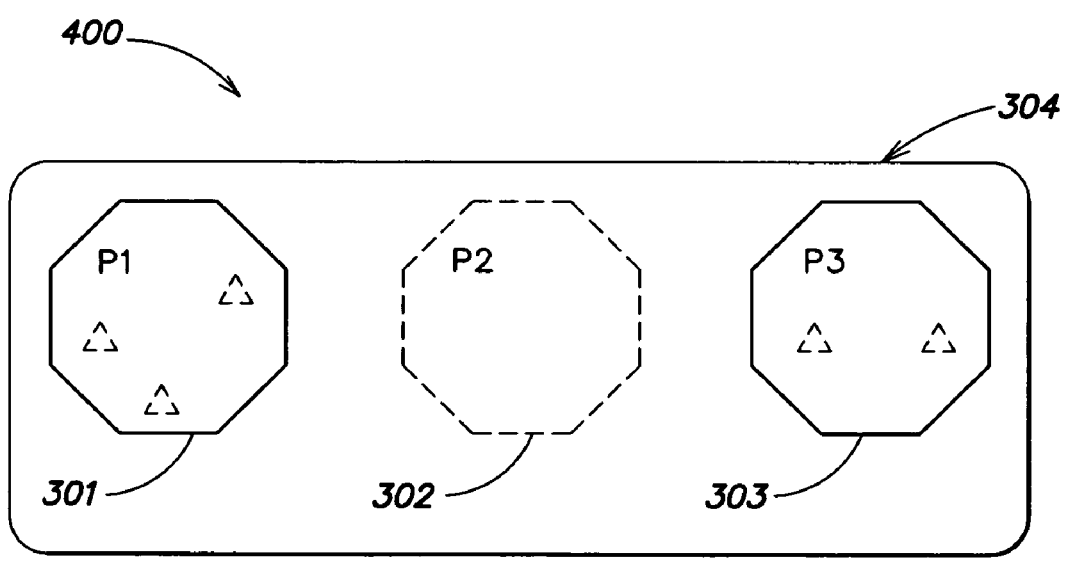

In representation 400 of FIG. 4, more information has been learned (e.g., by the loading application) about the projects, including the contents of projects 301 and 303, but not the contents of project 302. Enough information is known about the three files contained in project 301 and the two files in project 303 to visually indicate their presence, but the files are not yet available on the computer; i.e., they have not been loaded on to the computer yet.

Figure 5:
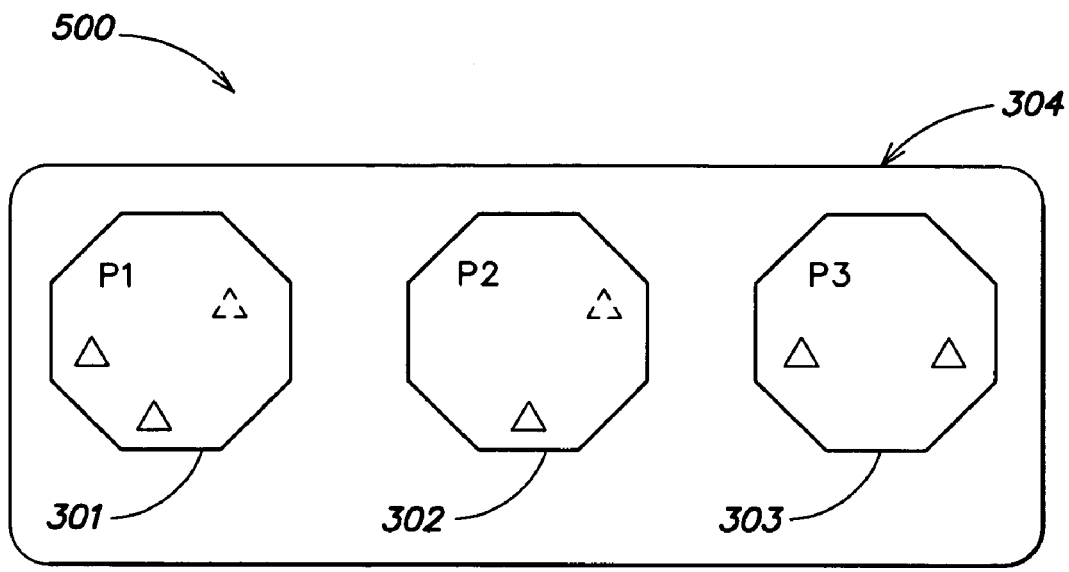

In representation 500 of FIG. 5, more information has been learned about the projects, including the contents of project 302. Further, two of the files in 301 and both of the files of project 303 are now available, and one of the files of project 302 is available. Thus, project 303 is fully loaded, while projects 301 and 302 are partially loaded.

Figure 6:
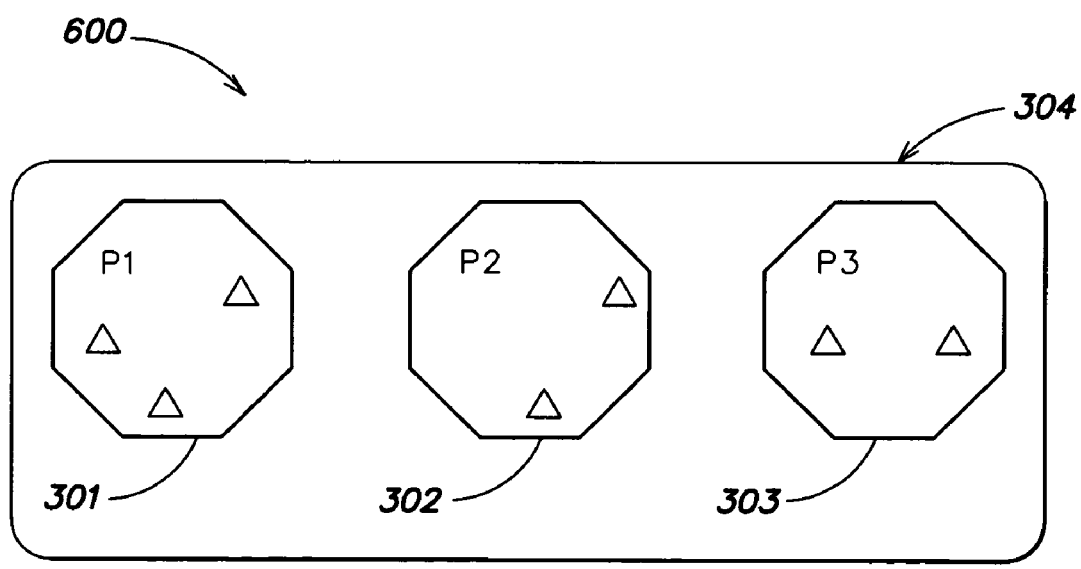
Figure 7:
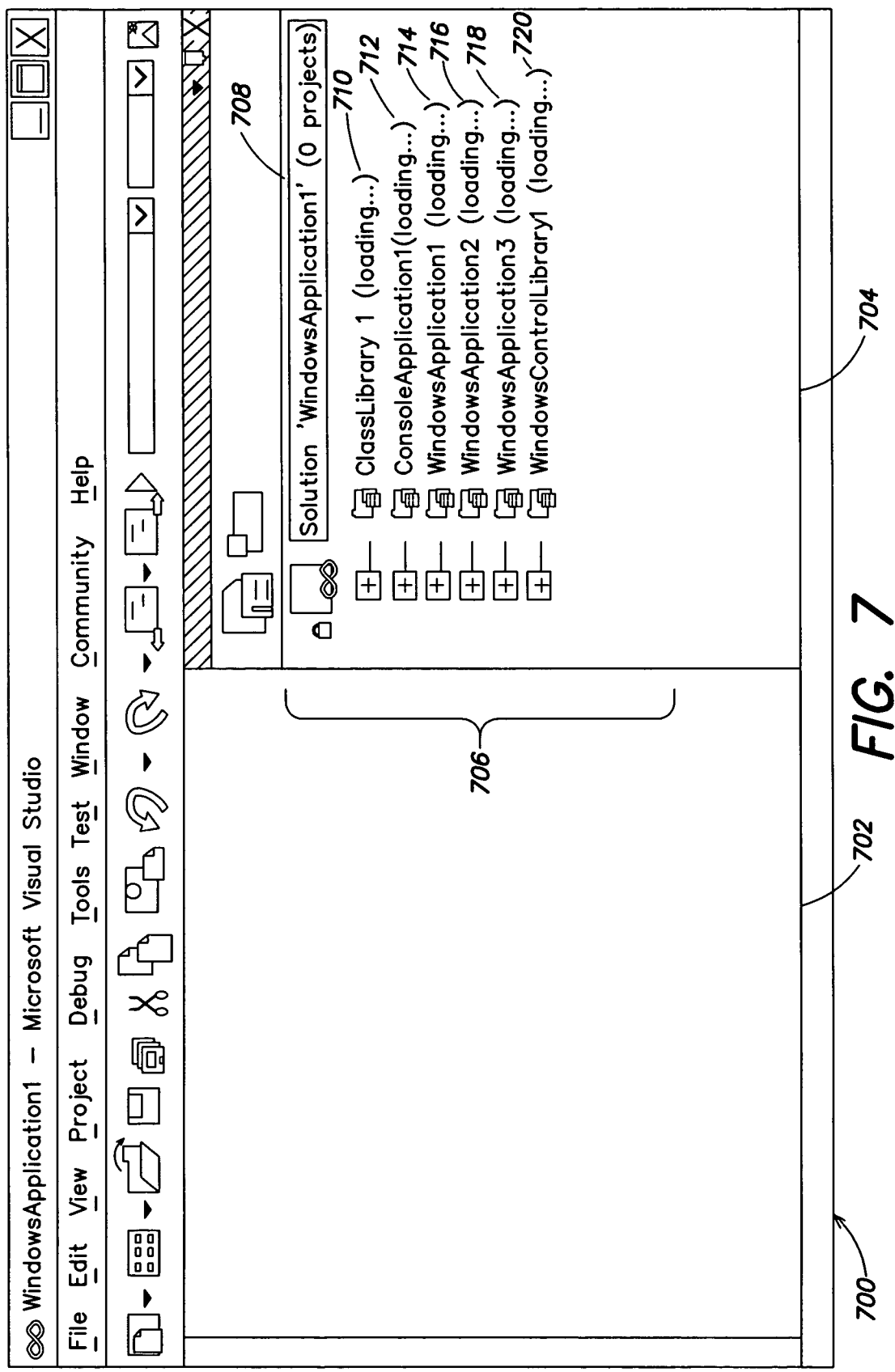

In representation 600 of FIG. 6, all of the projects 301-303 and thus the whole solution 301 are fully loaded on the computer (e.g., on local disk) and are available to users.

Having now discussed a symbolic example of a user interface making software components of a development set available to users as the development set is loading on to a computer, an actual example of such a user interface will now be described.

FIGS. 7-10 illustrate an example of a user interface display 700 for making software components of a development set 708 available to users as the development set is loading on to a computer. Display 700 is merely an illustrative embodiment of a user interface display for making software components of a development set available to users as the development set is loading on to a computer, and is not intended to limit the scope of the invention. Any of numerous other implementations of such a display, for example, variations of display 700, are possible and are intended to fall within the scope of the invention. Display 700 may be provided and controlled by user interface 200 described above in relation to FIG. 2.

Display 700 may include an editing window 702 and a set contents panel 704 for displaying a visual representation 706 of the contents of development set 708. As shown in panel 704, set 708 includes projects 710-720. Panel 704 may be configured to display an item identifier and item status for each software component of the set and the set itself. For example, as shown in panel 704, "0 projects" have been loaded so far for solution "WindowsApplication1," and all of the sets 710-720 have a status of "loading." Thus, only the solution itself is available, but none of its projects.

Figure 8:
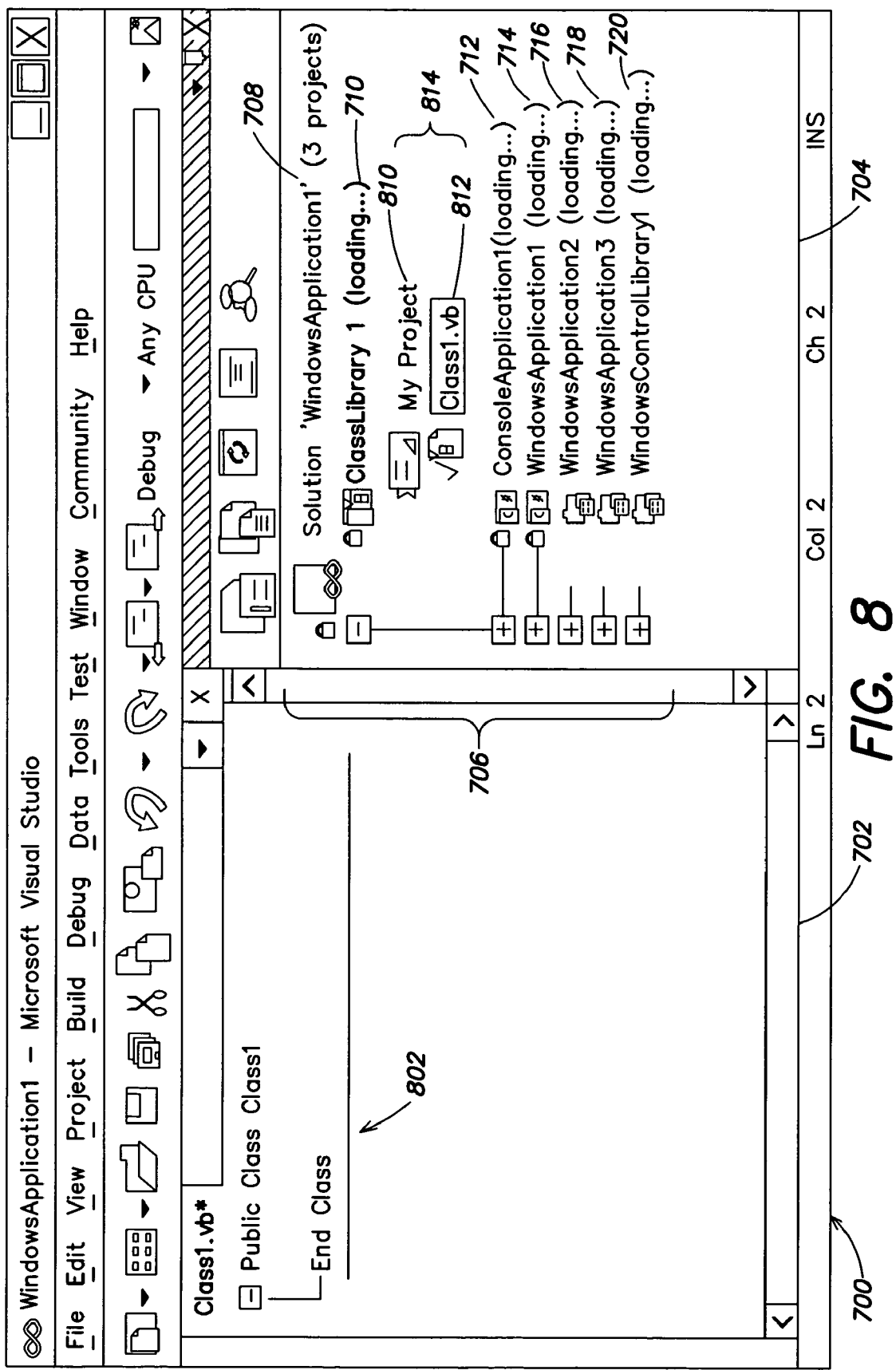

FIG. 8 illustrates that a some of the content 814 of project 710—file folder 810 and file 812—have been loaded, while the remainder of project 710 and the remaining projects 712-720 continue to load. As shown in editing window 702, the user has selected file 812 for editing, while the other solution content continues to load. The contents 802 of file 812 are shown in window 702.

Figure 9:
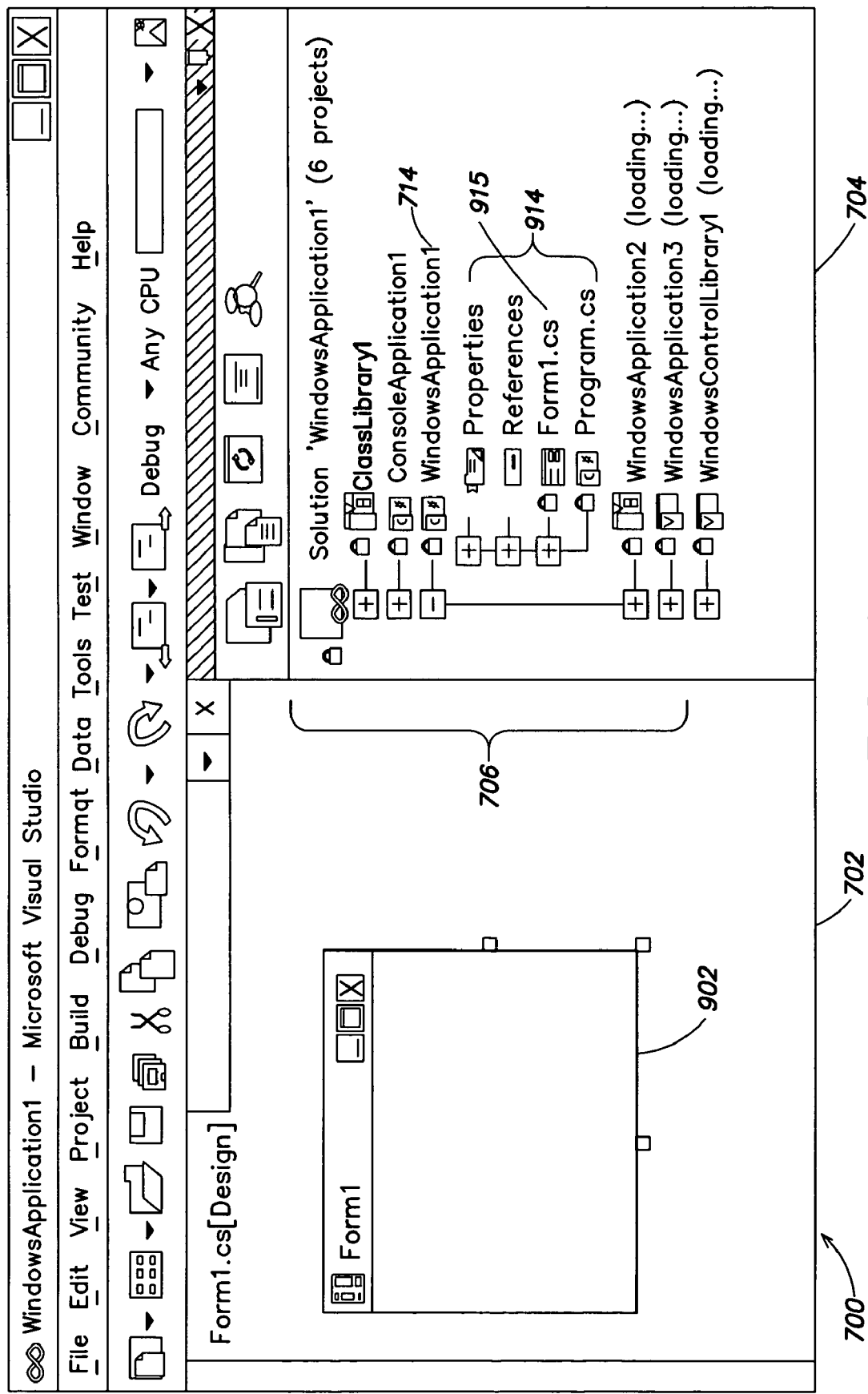

FIG. 9 illustrates that projects 710-714 have finished loading and projects 716, 718 and 720 continue to load. The contents 914 of project 714 are displayed. Further, the user has selected file 915 for editing, the contents 902 of which are shown in window 702. As shown in window 702, file 915 is a form.

Figure 10B:
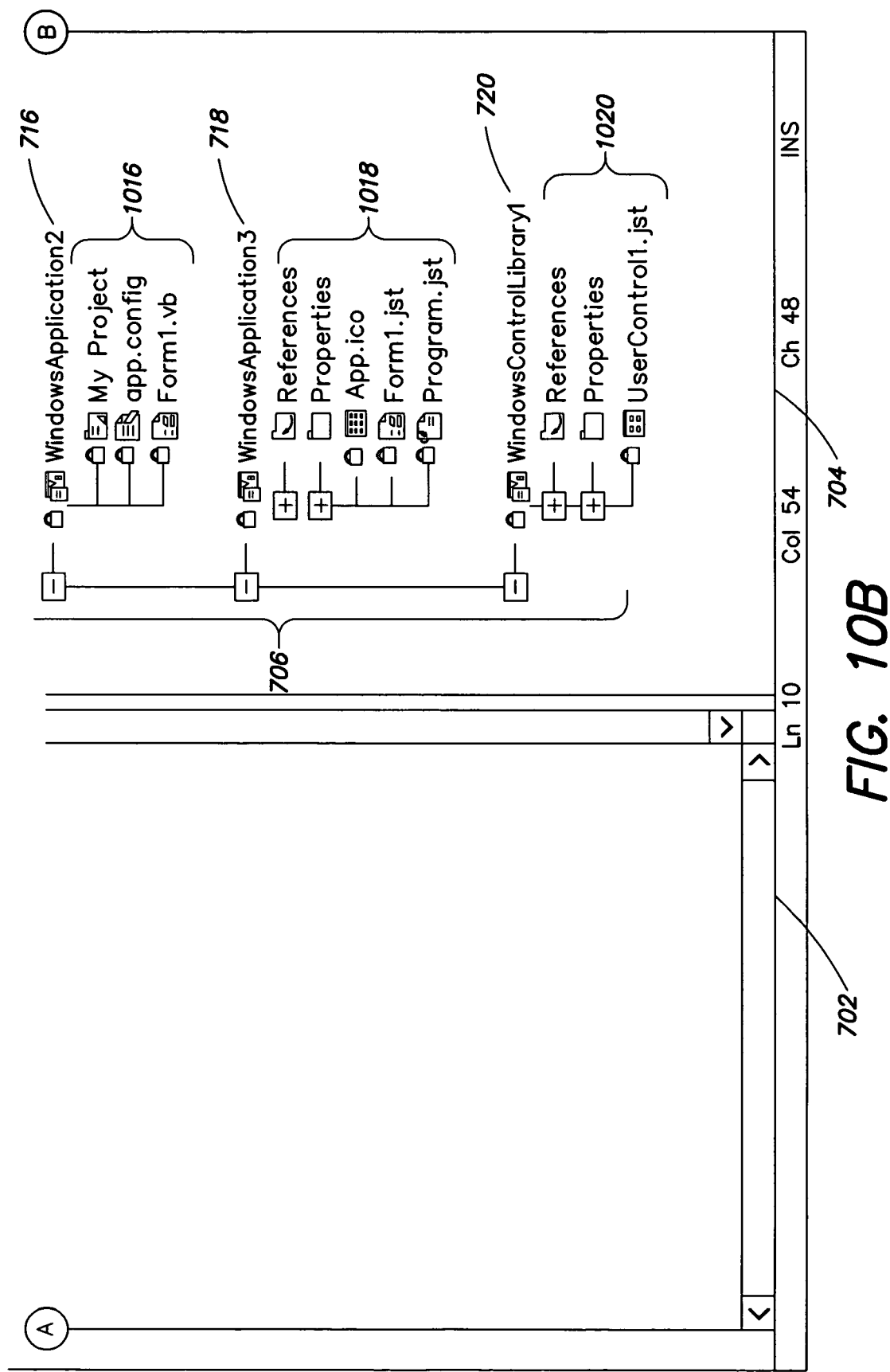

FIGS. 10A and 10B illustrate that all of the projects 710-720 have finished loading, the contents of which, 814, 1012, 914, 1016, 1018 and 1020, are displayed in panel 704. Further the user has selected file 1015 for editing, the contents 1002 of which are shown in window 702.

Figure 11:
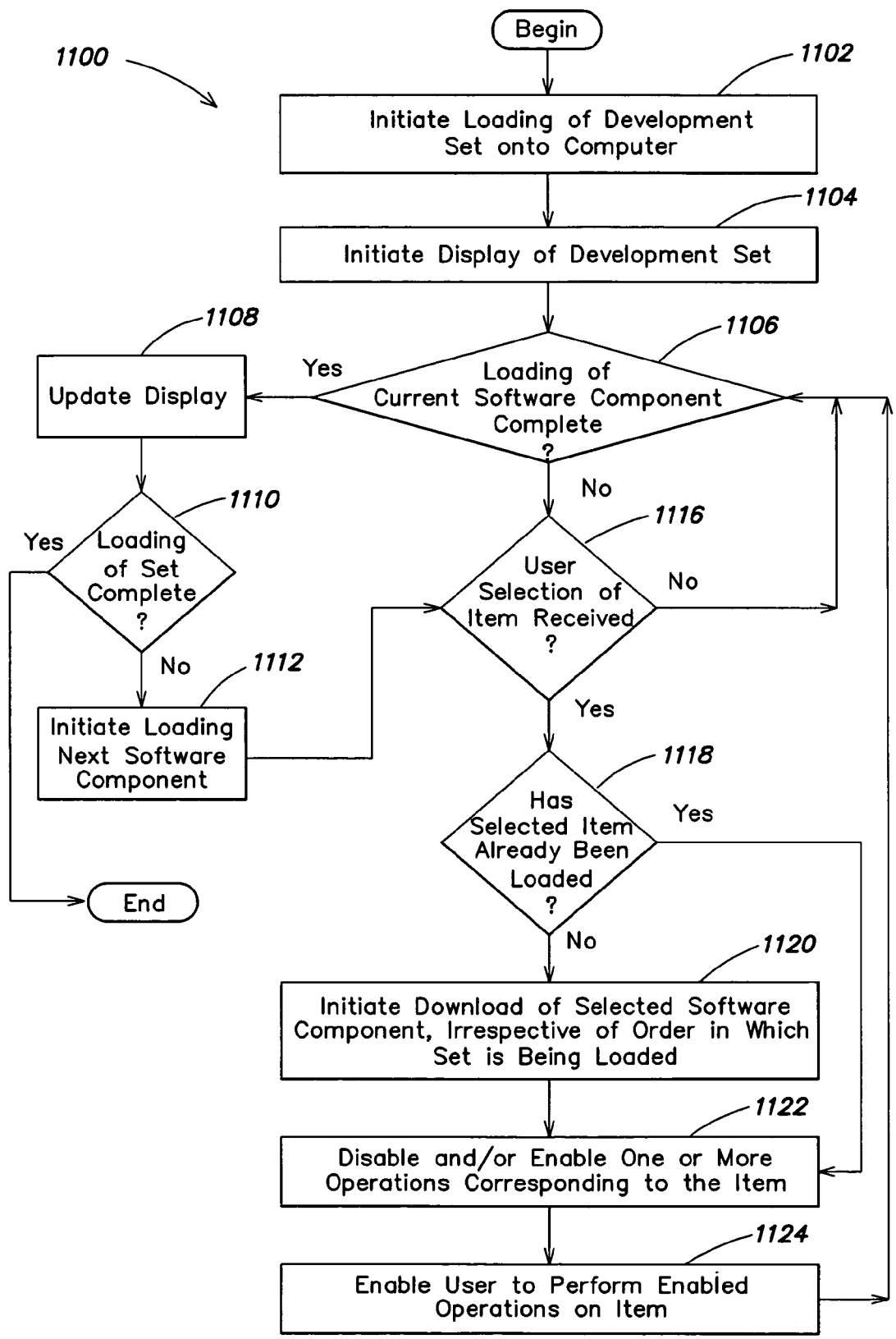
FIG. 11 is a flow chart illustrating an example of a method of accessing and loading software components of a development set on a computer while other software components of the set are being loaded on the computer.

FIG. 11 is a flow chart illustrating an example of a method 1100 of accessing and loading software components of a development set on a computer while other software components of the set are being loaded on the computer. Method 1100 is merely an illustrative embodiment of a method of accessing and loading software components of a development set on a computer while other software components of the set are being loaded onto the computer, and is not intended to limit the scope of the invention. Any of numerous other implementations of such a method, for example, variations of method 1100, are possible and are intended to fall within the scope of the invention. Method 1100 and acts thereof may be implemented using system 200 and parts thereof as described above in relation to FIG. 2.

In Act 1102, the loading of the development set onto the computer is initiated, for example, in response to a user selecting a set from a user interface display. The set may be loaded from any of a variety of locations such as, for example, a data source located remotely across a network from the computer.

In Act 1104, a display of the development set may be initiated. For example, after a software abstraction (e.g., a file) representing the development set itself has been loaded onto the computer, an indication of the presence of the development set may be displayed on a user interface display rendered on a display device of the computer such as, for example, user interface display 700 in FIG. 7.

Act 1104 also may include displaying an indication of one or more software components included within the development set, even though the software components have not actually been loaded yet onto the computer. Once a minimal amount of information necessary to identify the contents of a development set are loaded onto the computer, a visual indication of this component may be displayed on the user interface display (e.g., display 700). For example, an indication of a software component may be displayed after only an identifier and a location of the software component have been loaded onto the computer, as described above. Act 1104 and/or Act 1108 may include displaying a status of the loading of each software component of a development set, for example, as described above, in particular, in relation to FIGS. 7-10.

In Act 1106, it may be determined whether the loading of a current software component is complete. For example, it may be determined whether a project of an MVS solution has completed loading. If the loading of a software component has completed, then, in Act 1108, the display (i.e., visual representation) of the development set may be updated, for example, as described above, in particular, in relation to FIGS. 7-10.

If it is determined in Act 1110 that the loading of the development set is complete, then method 1100 may end. Otherwise, the loading of a next software component of the development set may be initiated in Act 1112. As described above, the loading of the development set may be performed according to a particular order, and Act 1112 may include determining a next software component to load in accordance with the particular order.

After the performance of Act 1112, or if it is determined in Act 1106 that the loading of a current software component is not complete, in Act 1116, it may determined whether a user selection of an item has been received. As described above, in some embodiments of the invention, a user may be enabled to select an item (e.g., the development set itself or a software component of the development set) prior to the completion of the loading of the development set. The user may be enabled to select software components that have completed loading and software components that have not completed loading (or even started loading). As described above, the user interface display (e.g., display 700) may indicate whether a software component has or has not completed loading, so that the user knows the status of the loading of the software component before selecting a software component.

If a user selection has not been received, then method 1100 may return to Act 1106. It should be appreciated that although Acts 1106 and 1116 are shown as occurring in sequence as part of method 1100, the invention is not so limited. For example, aspects of method 1100 may be implemented using event-based processing techniques. A system (e.g., system 200 of FIG. 2) implementing method 1100 may not actively perform Act 1116, but may be interrupted by an event indicating that a user has selected one of the software components. Thus, in some embodiments, method 1100 may sequentially load all the software components of a development set, and concurrently update a visual representation of the loading of the development set, without ever actively checking whether a user selection of a software component has occurred.

If it is determined in Act 1116 that a user selection of an item has been received, then in Act 1118 it may be determined whether the selected item has already been loaded. For example, throughout the loading of a development set, information (e.g., metadata) may be stored locally (e.g., temporarily). This information may include any of a variety of information about the loading process such as, for example, the content of the development set, the contents of software components of the development set, and the loading status of the development set and any of its software components. Act 1118 may include accessing the loading information to determine whether the item selected by the user has been loaded onto the computer yet.

If it is determined that the item has not been loaded yet, then, in Act 1120, a loading of the selected software component may be initiated, irrespective of the order in which the software components of the set are being loaded. That is, the selected software component can be loaded asynchronously. Further, as described above, the application loading the development set may be configured such that the asynchronous loading of one or more selected software components, in parallel to the synchronous loading of the remainder of the development set, takes precedence over the synchronous loading. For example, separate threads or processes may be used to load the development set and one or more selected components thereof, and the one or more threads or processes loading the selected components may be given priority over the thread or process loading the set.

After or during the performance of Act 1120, or after it has been determined that the selected item has already been loaded, one or more operations corresponding to the item may be disabled and/or enabled in Act 1122, for example, using an editing module of an IDE as described above. For example, the user may be enabled to modify the selected software component, but not perform any operations that involve use of other software components, or at least not the use of software components that have not been loaded yet onto the computer. For example, if the software component includes source code, the user may be enabled to edit the source code, but not build or compile the project including the source code, which may involve combining the selected component with other components to produce object code (e.g., an executable, dynamic or static library or a .NET assembly). Other operations may be disabled or enabled such as, for example, those described above.

After the operations have been disabled and/or enabled, in Act 1124, the user may be enabled to perform any of the enabled operations on the item. Throughout the performance of Acts 1118-1122, the loading of the development set continues, which is illustrated in FIG. 1100 by the return to Act 1110 from 1124.

Method 1100 may include additional acts. Further, the order of the acts performed as part of method 1100 is not limited to the order illustrated in FIG. 11, as the acts may be performed in other orders and/or one or more of the acts may be performed in series or in parallel, at least partially. For example, as described above, method 1100 may be performed using known event-based processing techniques. Further, Acts 1106-1112 may be performed concurrently to the performance of Acts 1118-1124.

Method 1100 acts thereof and various embodiments and variations of this method and these acts, individually or in combination, may be defined by computer-readable signals tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 1100 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 1200 and 1300 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described in relation to FIGS. 1, 2, 12 and 13, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (ANM) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

Figure 12:
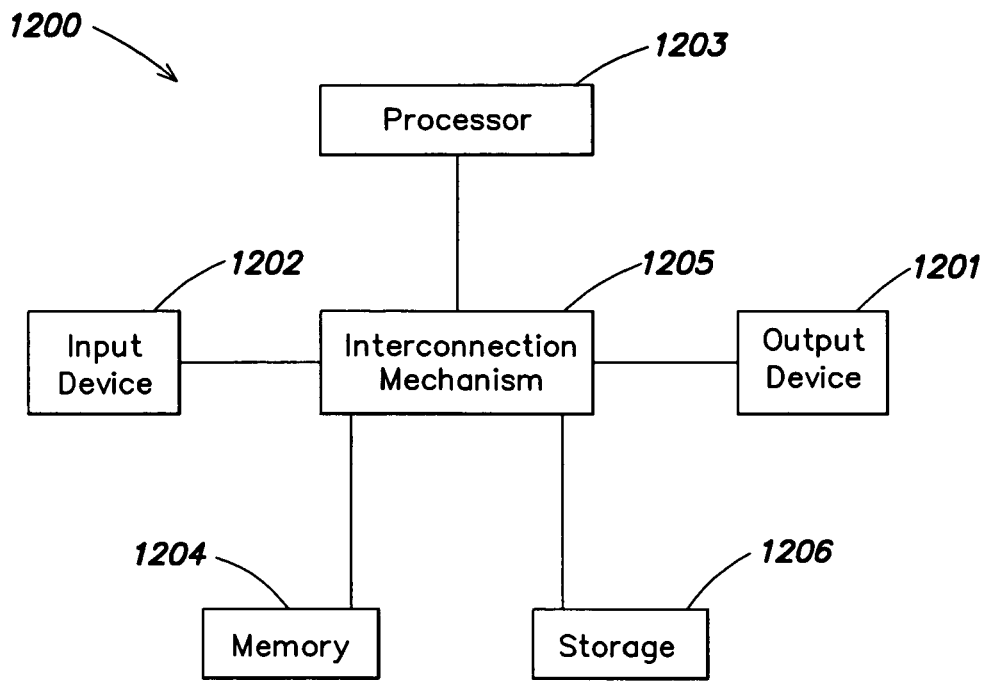
FIG. 12 is a block diagram illustrating an example of a computer system on which some embodiments of the invention may be implemented.

For example, various aspects of the invention may be implemented as specialized software executing in a general-purpose computer system 1200 such as that shown in FIG. 12. The computer system 1200 may include a processor 1203 connected to one or more memory devices 1204, such as a disk drive, memory, or other device for storing data. Memory 1204 is typically used for storing programs and data during operation of the computer system 1200. Components of computer system 1200 may be coupled by an interconnection mechanism 1205, which may include one or more busses (e.g., between components that are integrated within a same machine) and/or a network (e.g., between components that reside on separate discrete machines). The interconnection mechanism 1205 enables communications (e.g., data, instructions) to be exchanged between system components of system 1200. Computer system 1200 also includes one or more input devices 1202, for example, a keyboard, mouse, trackball, microphone, touch screen, and one or more output devices 1201, for example, a printing device, display screen, speaker. In addition, computer system 1200 may contain one or more interfaces (not shown) that connect computer system 1200 to a communication network (in addition or as an alternative to the interconnection mechanism 1205.

Figure 13:
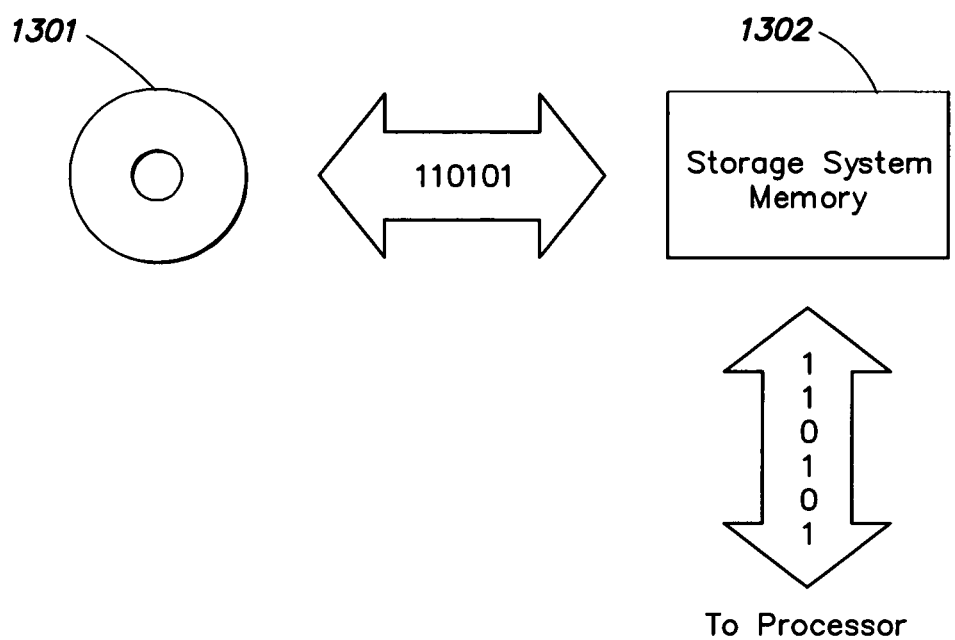
FIG. 13 is a block diagram illustrating an example of a storage system that may be used as part of the computer system to implement some embodiments of the invention.

The storage system 1206, shown in greater detail in FIG. 13, typically includes a computer readable and writeable nonvolatile recording medium 1301 in which signals are stored that define a program to be executed by the processor or information stored on or in the medium 1301 to be processed by the program. The medium may, for example, be a disk or flash memory. Typically, in operation, the processor causes data to be read from the nonvolatile recording medium 1301 into another memory 1302 that allows for faster access to the information by the processor than does the medium 1301. This memory 1302 is typically a volatile, random access memory such as a dynamic random access memory (DRAM) or static memory (SRAM). It may be located in storage system 1206, as shown, or in memory system 1204, not shown. The processor 1203 generally manipulates the data within the integrated circuit memory 1204, 1602 and then copies the data to the medium 1301 after processing is completed. A variety of mechanisms are known for managing data movement between the medium 1301 and the integrated circuit memory element 1204, 1302, and the invention is not limited thereto. The invention is not limited to a particular memory system 1204 or storage system 1206.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the invention may be practiced, it should be appreciated that aspects of the invention are not limited to being implemented on the computer system as shown in FIG. 12. Various aspects of the invention may be practiced on one or more computers having a different architecture or components that that shown in FIG. 12.

Computer system 1200 may be a general-purpose computer system that is programmable using a high-level computer programming language. Computer system 1200 also may be implemented using specially-programmed, special-purpose hardware. In computer system 1200, processor 1203 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of providing user access to a software development set including a plurality of software components, comprising:

downloading, to a computing device, information identifying a plurality of software components contained in the software development set, the information being downloaded prior to completing downloading of the software development set;

displaying, on a display of the computing device, a visual representation of the software development set as the software development set is being downloaded, in a first process, to the computing device over a network, including displaying, for each of the plurality of software components of the software development set identified by the information, a corresponding visual representation;

receiving, during the downloading of the software development set, a user input of an item from the visual representation of the software development set specifying a selected software component from among the plurality of software components identified by the information as being contained in the software development set being downloaded;

in response to the user input, downloading, in a second process, the selected software component, wherein the first process and the second process execute concurrently, and the second process has priority over the first process; and after the selected software component has been downloaded in the second process, executing, in response to user inputs, operations on the selected software component while continuing downloading, in the first process, of the software development set.

2. The method of claim 1, wherein displaying comprises, for each of the software components, displaying the corresponding visual representation of the software component prior to the software component being loaded on to the computer.

3. The method of claim 1, wherein displaying comprises, for each of the software components, displaying an indication of when the software component is loading and/or when the software component has completed downloading.

4. The method of claim 1, wherein the selected software component is a file comprising source code, and wherein executing operations comprises enabling the user to modify the source code of the selected software component.

5. The method of claim 1, further comprising enabling specified operations to be executed by the selected software component during downloading, in the first process, of the software development set, the enabling based on operations that do not require other components of the software development set being downloaded.

6. The method of claim 5, wherein the method further comprises disabling specified operations from being performed using the selected software component during downloading, in the first process, of the software development set, the disabled operations being operations that require components of the software development set that have not yet been downloaded.

7. A computer-readable storage medium encoded with computer instructions that, when executed by a computing device, control the computing device to perform a method of providing user access to a software development set including a plurality of software components, the method comprising:

downloading metadata to a computing device, the metadata identifying the plurality of software components contained in the software development set;

displaying, in an Integrated Development Environment (IDE), a visual representation of the software development set as the software development set is being downloaded, in a background process, to the computing device over a network, including displaying, for each of the plurality of software components of the software development set identified by the metadata, a corresponding visual representation;

receiving, during the downloading of the software development set, a first user input of an item from the visual representation of the software development set specifying a selected software component from among the plurality of software components identified by the metadata as being contained in the software development set being downloaded;

in response to the user input, downloading, in a primary process, the selected software component, wherein the background process and the primary process execute concurrently, and the primary process has priority over the background process;

after the selected software component has been downloaded in the primary process; and while continuing downloading, in the background process, of the software development set, determining whether executing an operation in response to a second user input requires a software component of the software development set that has not yet been downloaded; and when it is determined that executing the operation in response to the second user input does not require a software component of the software development set that has not yet been downloaded, executing said operation, wherein executing said operation utilizes the selected software component.

8. The computer-readable storage medium of claim 7, wherein displaying further comprises, for each of the software components, displaying the corresponding visual representation of the software component prior to the software component being downloaded to the computing device.

9. The computer-readable storage medium of claim 7, wherein displaying further comprises, for each of the software components, displaying an indication of when the software component is loading and/or when the software component has completed downloading.

10. The computer-readable storage medium of claim 7, wherein at least one of the software components is a file comprising source code, and
wherein executing operations comprises enabling the user to modify the source code of the at least one file.

* * * * *